(12) United States Patent
Sanford et al.

(10) Patent No.: US 6,991,050 B1
(45) Date of Patent: Jan. 31, 2006

(54) DRIVE MECHANISM FOR TRAILER

(76) Inventors: Dana L. Sanford, 227 SW. 3rd St., Redmond, OR (US) 97756; Terry Ross, P.O. Box 572, Mill City, OR (US) 97360; David Bagley, 15980 Park Dr., Lapine, OR (US) 97739

( * ) Notice: Subject to any disclaimer, the term of this patent is extended or adjusted under 35 U.S.C. 154(b) by 71 days.

(21) Appl. No.: 10/715,643

(22) Filed: Nov. 19, 2003

(51) Int. Cl.
B62D 51/04 (2006.01)

(52) U.S. Cl. ........................................ 180/13; 180/19.1
(58) Field of Classification Search ................. 180/11, 180/12, 13, 19.1, 19.2, 19.3, 16
See application file for complete search history.

(56) References Cited

U.S. PATENT DOCUMENTS

| | | | |
|---|---|---|---|
| 3,584,753 A | 6/1971 | Voeller | |
| 3,783,960 A * | 1/1974 | Feliz | 180/14.2 |
| 3,826,322 A * | 7/1974 | Williams | 180/202 |
| 3,874,535 A | 4/1975 | Killer | |
| 3,970,203 A | 7/1976 | Watson, Jr. | |
| 4,211,513 A | 7/1980 | Hosie | |
| 4,363,590 A | 12/1982 | Crate | |
| 4,637,770 A | 1/1987 | Swadell | |
| 4,860,841 A * | 8/1989 | Sacco | 180/13 |
| 4,974,865 A | 12/1990 | Capps | |
| 5,040,937 A | 8/1991 | Godbersen | |
| 5,249,910 A | 10/1993 | Ball | |
| 5,287,821 A | 2/1994 | Godbersen | |
| 5,609,462 A | 3/1997 | Reimer | |
| 5,970,906 A | 10/1999 | Hrescak et al. | |
| 6,347,677 B1 * | 2/2002 | Collins | 180/13 |
| 6,382,898 B2 | 5/2002 | Mason | |
| 6,439,545 B1 * | 8/2002 | Hansen | 254/420 |
| 6,619,671 B1 * | 9/2003 | Fine | 280/3 |
| 6,758,291 B1 * | 7/2004 | Koch | 180/11 |
| 6,779,616 B1 * | 8/2004 | Brown | 180/13 |

OTHER PUBLICATIONS

Power Wheel USA, LLC; Web Page www.powerwheel-usa.com; Nov. 10, 2003.

* cited by examiner

Primary Examiner—Kevin Hurley
(74) Attorney, Agent, or Firm—George L. Williamson

(57) ABSTRACT

The present invention discloses a drive wheel for placement on the front end of a boat trailer or the like which wheel both drives and steers a trailer into a position where the trailer tong can be connected to the rear end of the towing vehicle. The concept of the present invention may also be applied to other similar vehicles, such as trailers for hauling snowmobiles, woodcutters or water crafts and other heavy objects and possibly for travel trailers.

4 Claims, 12 Drawing Sheets

DRIVE MECHANISM FOR TRAILER

BACKGROUND OF THE INVENTION

1. Field of the Invention

The present invention relates generally to trailers and, more particularly, is concerned with a trailer having a drive mechanism placed on the tongue thereof.

2. Description of the Prior Art

Devices for loading boats and driving trailers have been described in the prior art; however, none of the prior art devices disclose the unique features of the present.

In U.S. Pat. No. 4,363,590, dated Dec. 14, 1982, Crate disclosed a boat which is supported on a wheeled trailer frame by idler rollers and by powered rollers, of a self-adjusting type, located adjacent the rear end of the trailer frame from which the boar is loaded or unloaded. The powered rollers are driven by drive motors through self-locking gears to effect loading or unloading. The boat is held in a transport position on the trailer frame by the powered rollers through the self-locking gearing when the drive motors are de-energized.

In U.S. Pat. No. 4,211,513, dated Jul. 8, 1980, Hosie disclosed a releasable pulley device that can be readily attached to the center rear of a boat trailer and through which the tow-in line for a boat is threaded. As the boat is winched in to the rear of the trailer, an alignment of the prow with the center rear of the trailer is effected. The pulley device is released from its seating and rides free on the line as the boat is fully winched on to the trailer. This enables the dry loading of a boat from rough water as a one-man operation.

In U.S. Pat. No. 6,382,898 B2, dated May 7, 2002, Mason disclosed an apparatus for loading and retaining for transport, an article, such as a boat, onto a vehicle, particularly a pickup truck. The apparatus comprises a pivoting rear frame member and a forward supporting frame member attached to the truck. The rear frame member has a laterally spaced pair of arms which are pivotally attached to the vehicle, such as onto the trailer hitch of the vehicle, and an upper interconnecting portion for supporting a rear portion of the boat. The rear frame member raises the boat as it is pivoted from a near horizontal position to a vertical position, by suitable means such as a winch.

In U.S. Pat. No. 4,974,865, dated Dec. 4, 1990, Capps disclosed an improved boat trailer winch mechanism that involves an adjustable triangular assembly comprising a first and second vertical support means attached to each other at the apex and to the tongue of a boat trailer forming the base. Extending rearwardly from the adjustable triangular assembly is a novel bow engaging mechanism capable of pivoting and adjusting such as to make contact on both sides of a boat hull. Cantilevered upward and forward from the triangular assembly is a third support member and manual winch with strap and hook closure. Preferably, the strap is directed downward to the tongue and selectively to the proper height through the rear structural member to the triangular assembly such as to insure proper tension when loading or transporting a boat on the boat trailer. Such a boat trailer winch allows the loading of a small pleasure craft onto a boat trailer without leaving the boat and risking getting wet in less time than previously known boat winches.

In U.S. Pat. No. 4,637,770, dated Jan. 20, 1987, Swadell disclosed a lifting-type boat trailer which collapses to a substantially flat position to allow the trailer to be driven between the pontoons of a pontoon boat with its pontoons sitting on the ground. A winch fixed to the front of the trailer applies force via a cable both to the front end of the trailer through a pulley attachment and also to the rear end of the trailer through a bell crank mechanism whose effective working lever arm varies from a maximum at the collapsed position of the trailer to a minimum at the fully raised position, whereby lifting forces applied to the trailer are self-equaling so that the maximum lifting forces are always applied to those points of the trailer which are subjected to the heaviest weight load. The maximum lifting force is automatically transferred from the rear to the front of the trailer as the trailer is raised. The cable is attached to the bell crank mechanism through a dual diameter drum and shaft assembly which provides further force-multiplication or mechanical advantage at the rear of the trailer.

In U.S. Pat. No. 3,874,535, dated Apr. 1, 1975, Killer disclosed a device securable to the frame of the vehicle and is fully adjustable as to size. It includes a hinged boat platform, which can be held level with the top of the boat for ease in securing the boat thereof to the platform by the gunwales of the boat, and includes means to secure the outboard motor also. Winch means are provided to elevate the attached boat onto the top of the vehicle and to lower same to the ground when it is desired to unload the boat from the vehicle.

In U.S. Pat. No. 3,970,203, dated Jul. 20, 1976, Watson, Jr., disclosed a low-slung boat trailer which is provided with a swinging back gate and swinging crossbeam above the boat when loaded on the trailer so that a camper trailer may be loaded above the boat by an electric winch, and the boat trailer still used for launching and retrieving a boat.

In U.S. Pat. No. 3,584,753, dated Jun. 15, 1971, Voeller disclosed a wheeled trailer body having a bed provided with upstanding longitudinal side fenders, whose top walls are apertured to receive either the bottom ends of the side stakes of a rectangular enclosure or depending lugs on the ends of a plurality of boat-supporting transverse brackets, so that the body can be adapted for use either as a cargo trailer or as a boat trailer. The trailer body has a hitch tongue for attachment to a motor vehicle. A winch assembly can be mounted on the hitch tongue when the body is used as a boat trailer.

In U.S. Pat. No. 5,249,910, dated Oct. 5, 1993, Ball disclosed a horizontal generally rectangular frame structure constructed from aluminum, or iron, longitudinal and transverse beams mounted on the interior surface of a pick-up truck. The frame structure having one or more pairs of longitudinal boat support members, or channels, mounted on the top surface. The channels having a top cover of a low coefficient of friction plastic material are spaced to accommodate the keel structure of a jet-ski. Auxiliary pairs of channels are removably connected to the rear ends of the truck-mounted channels extending downwardly to the ground surface. An electric powered winch mounted on a vertical support on the forward portion of the frame structure accommodates a cable that is removably attached to the bow of the jet-ski. The jet-ski with its bow placed on the channels and connected to the winch cable is pulled up onto the truck body when the winch motor is energized.

In U.S. Pat. No. 5,287,821, dated Feb. 22, 1994, Godbersen disclosed a boat hoist having a platform for raising and lowering a boat by a normally manually rotated circular lift wheel, winch, and cable arrangement, an electrically powered drive motor assembly mounted adjacent the lift wheel and including a drive wheel biased between a position of non-engagement with the lift wheel, and a position of engagement therewith for rotation of the lift wheel, power for the drive motor provided by the DC power source win the boat being moved or by a shore supplied AC power source.

In U.S. Pat. No. 5,609,462, dated Mar. 11, 1997, Reimer disclosed a boat loader and carrier for mounting on a motor vehicle such as a pick-up truck, comprising an upper frame for supporting the boat, having forward and rearward ends and transversely spaced legs whose proximate ends are attached to the upper frame, said legs extending downwardly from the transversely spaced side edges of the rearward end of the frame, the distal ends of the legs pivotally attachable to a lower frame clamped to the pick-up truck so as to allow the upper frame to pivot about the pivotal axes between a generally horizontal carrying position above and substantially parallel with the roof of the pick-up and a loading/unloading position inclined downwardly rearwardly relative to the carrying position; a winch fixed in position forwardly relative to the pivotal axes of the legs when the loader and carrier is mounted on the vehicle, for pulling the boat onto the upper frame and for allowing the boat to be controllably lowered off the upper frame, and a cable connecting the upper and lower frames for limiting the maximum inclination of the upper frame.

In U.S. Pat. No. 5,970,906, dated Oct. 26, 1999, Hrescal, et al., disclosed a motion compensation winch which has a number of opening modes to launch and recover a boat and take into account wave movement. The winch has a cable drum for winding a cable thereon, a secondary gear reduction to rotate the drum, a primary gear reduction between a hydraulic motor shaft and the secondary gear reduction, a rotational sensor to sense direction of cable drum rotation, a load sensor to determine when a tension on the cable is above or below a predetermined value and a secondary clutch to disengage the cable drum and permit the cable drum to rotate freely. The winch has a manual mode for manual operation, and four operational modes to keep the cable taut while a boat rises and fills on waves, a free wheel mode and a recovery mode for recovering a boat that is rising and falling on waves.

In U.S. Pat. No. 5,040,937, dated Aug. 20, 1991, Godbersen disclosed a boat trailer and jack stand winch assembly. The jack stand is mounted onto the frame of the trailer and can folded into a stowed position for traveling.

A device for driving a trailer or a recreational vehicle is being marketed by a company by the name of Power Wheel USA, LLC, 4140 JVL Industrial Park Drive, Unit 207, Marietta, Ga. 30066. This company has a web site address "www.powerwheel-usa.com". The device is controlled by a handheld remote control unit. Applicant has found no patent which appears to cover this device.

While these trailer loading devices may be suitable for the purposes for which they were designed, they would not be as suitable for the purposes of the present invention, as hereinafter described.

SUMMARY OF THE PRESENT INVENTION

The present invention discloses a drive mechanism and wheel for placement on the tongue of a trailer or the like which wheel both drives and steers the trailer into a position where the trailer tongue can be connected to the rear end of the towing vehicle in order to make loading and maneuvering the trailer easier. The concept of the present invention may be applied to trailers for hauling animals, snowmobiles, woodcutters, water crafts, travel trailers and other heavy objects.

An object of the present invention is to provide a means for providing driving and steering power to a trailer upon which a heavy object is placed. A further object of the present invention is to provide the capability for loading an object onto a trailer. Still another object is to provide an electrically powered drive wheel for a trailer having a heavy objected loaded thereon to assist in loading and maneuvering. A further object of the present invention is to enable physically handicapped people or individuals having persistent injuries, such as arthritis, to load heavy objects onto a trailer and to connect a trailer to a towing vehicle.

The foregoing and other objects and advantages will appear from the description to follow. In the description reference is made to the accompanying drawings, which form a part hereof and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
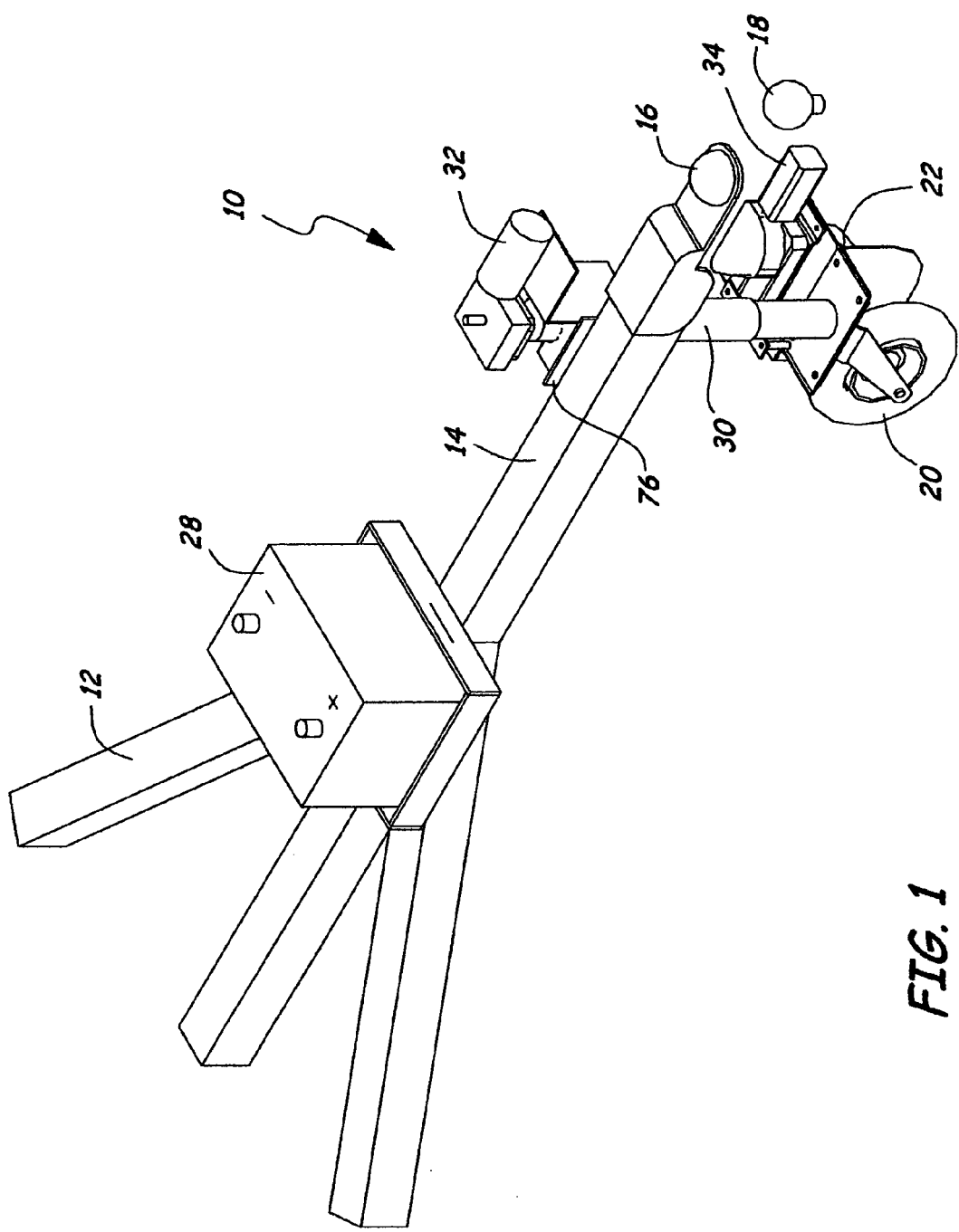
FIG. 1 is a perspective view of the present invention.

With regard to reference numerals used, the following numbering is used throughout the drawings.

10 present invention
12 trailer
14 tongue
16 hitch
18 ball
20 wheel
22 drive motor
24 controller
26 electrical connection
27 electrical connection
28 battery
29 electrical connection
30 arm
31 electric connection 32 lift motor
34 steering motor
36 gear mechanism
38 arm
40 arm
42 platform
44 gear mechanism
46 gear mechanism
48 boat trailer
50 utility trailer
52 animal trailer
54 chain sprocket
56 axle
58 gear
60 gear
62 axle
66 bearing race
68 threaded shaft
70 gear
72 fork
74 belt
75 chain
76 attachment means
78 up/down control
80 forward/reverse control
82 on/off control
84 right/left control

DETAILED DESCRIPTION OF THE PREFERRED EMBODIMENT

The following discussion describes in detail one embodiment of the present invention. This discussion should not be construed however, as limiting the invention to those particular embodiments since practitioners skilled in the art will recognize numerous other embodiments as well. For a definition of the complete scope of the invention the reader is directed to the appended claims wherein.

Turning to FIG. 1, shown therein is the present invention 10 wherein a trailer 12 has the present invention 10 attached at 76 to the tongue 14 thereof similar to a trailer jack. Also shown are the hitch 16 and ball 18 and drive wheel 20. Shown disposed next to the wheel 20 is the drive motor 22, which drive motor is electrically operated and has means for connection to the drive wheel 20 which could be, e.g., a chain and sprocket or a drive shaft and U-joints and would be connected in the standard manner as would be done by one skilled in the art. The battery 28 is shown disposed on trailer 12. The present invention also has a shock absorber-like arm 30 which extends and retracts in an up-and-down fashion in order to raise and lower the wheel assembly in a manner similar to a trailer jack. The shock absorber arm is driven by a second driver motor 32 disposed on the upper end of arm 30. Motor 32 also has a gear mechanism 46 which is connected to and operates arm 30. Also shown is motor 34 which steers wheel 20 in a left and right direction.

Figure 2:
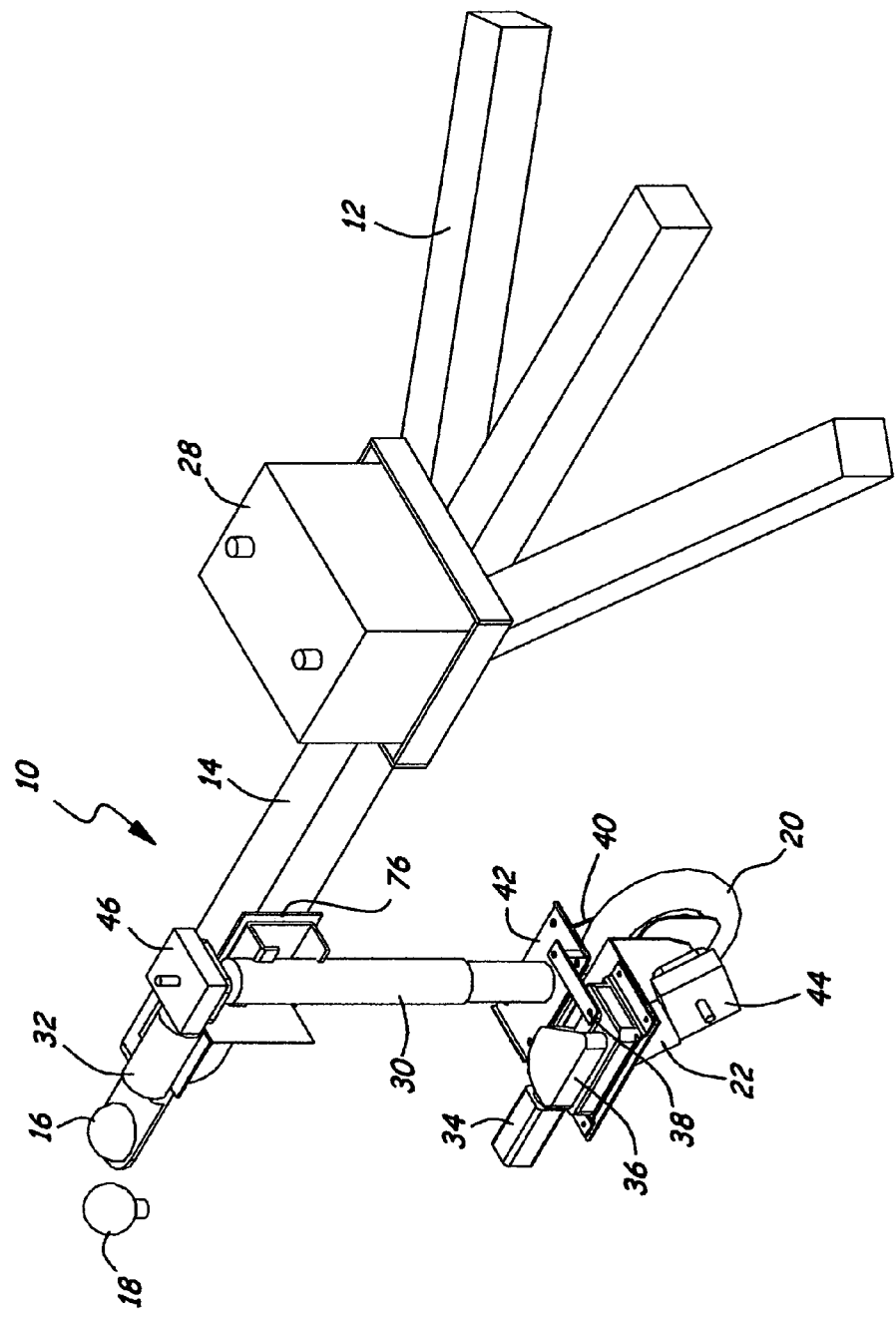
FIG. 2 is a perspective view of the present invention.

Turning to FIG. 2, therein is shown the present invention 10 attached by means 76 to the tongue 14 of the trailer 12 along with hitch 16, connecting ball 18, drive motor as shown at 22, wheel 20, battery 28, arm 30, upper lift motor 32 and steering motor 34. The present invention 10 is attached as shown at 76 in a conventional manner as would be done by one skilled in the art. It can be seen that steering motor 34 is connected to a gear means 36 having an arm 38 extending therefrom connected to a second arm 40 which is connected to a platform 42 to which wheel 20 is connected. The motor 34 rotates in a direction selected by a user to operate the gear mechanism 36 and move arm 40 in the appropriate direction to turn platform 42 and wheel 20 connected thereto so that the wheel can be turned to the left or the right. Drive motor 22 turns wheel 20 through another gear mechanism 44 in a direction to move the trailer either forward or to the rear. Lift motor 32 connects through a third gear mechanism 46 so as to move telescoping arm 30 up and down in order to raise and lower the wheel and thus the trailer tongue 14. Thus it can be seen that the three motors 22, 32 and 34 are each connected through gear mechanisms 44, 46 and 36 so as to provide the functions of driving, lifting or steering to the present invention in order to operate the present invention in the desired manner. The present invention 10 also serves as a jack for trailer 12 and may be optionally designed to be rotated about 90 degrees counter-clockwise to a stowed position when the trailer is being towed by a vehicle at high speed on a highway similarly to a conventional trailer jack.

Figure 3:
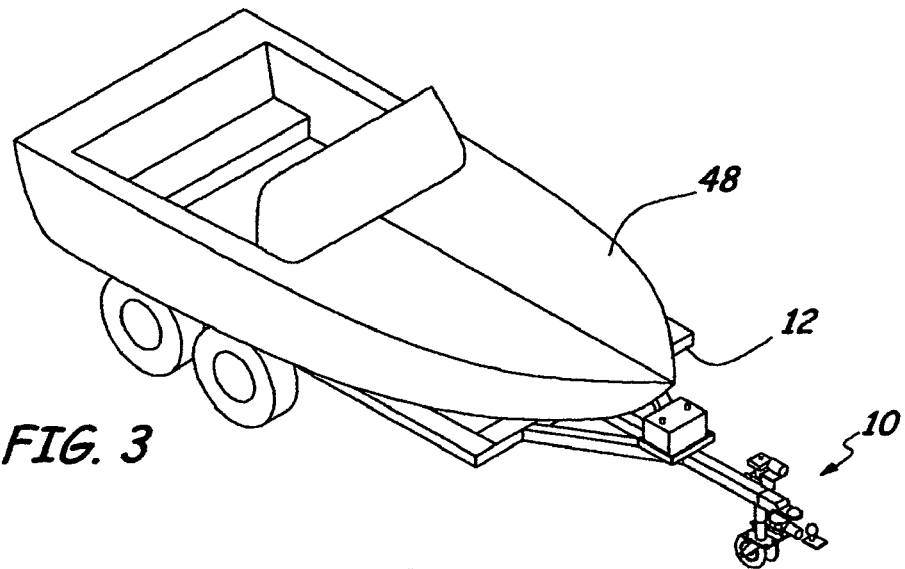
FIG. 3 is a perspective view of one type trailer upon which the present invention can be used.
Figure 4:
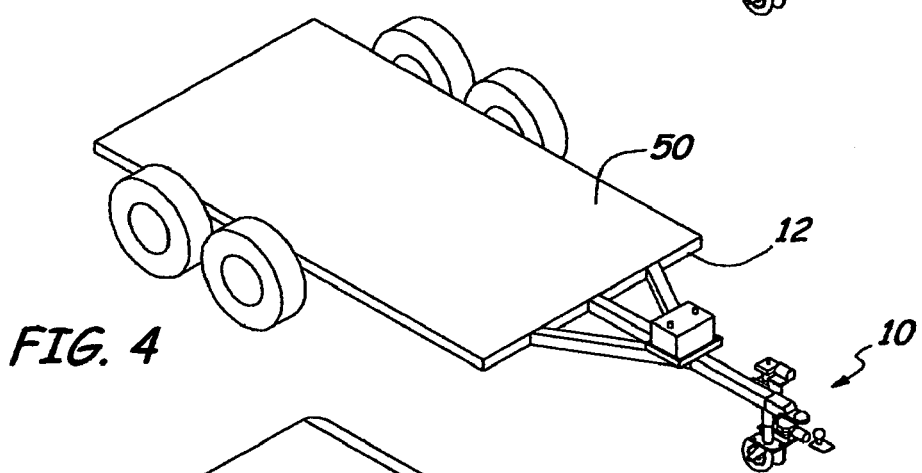
FIG. 4 is a perspective view of one type trailer upon which the present invention can be used.
Figure 5:
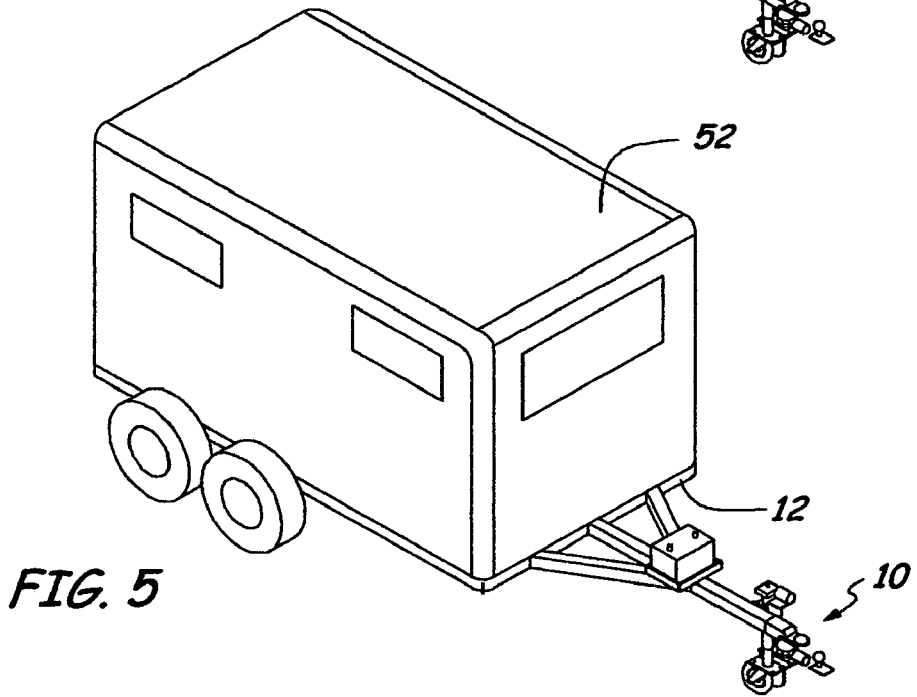
FIG. 5 is a perspective view of one type trailer upon which the present invention can be used.

Turning to FIGS. 3 through 5, therein is shown the present invention 10 mounted on trailers 12 which provide different types of trailers wherein a boat trailer 48 is provided, utility trailer 50 and an animal trailer 52 is provided.

Figure 6:
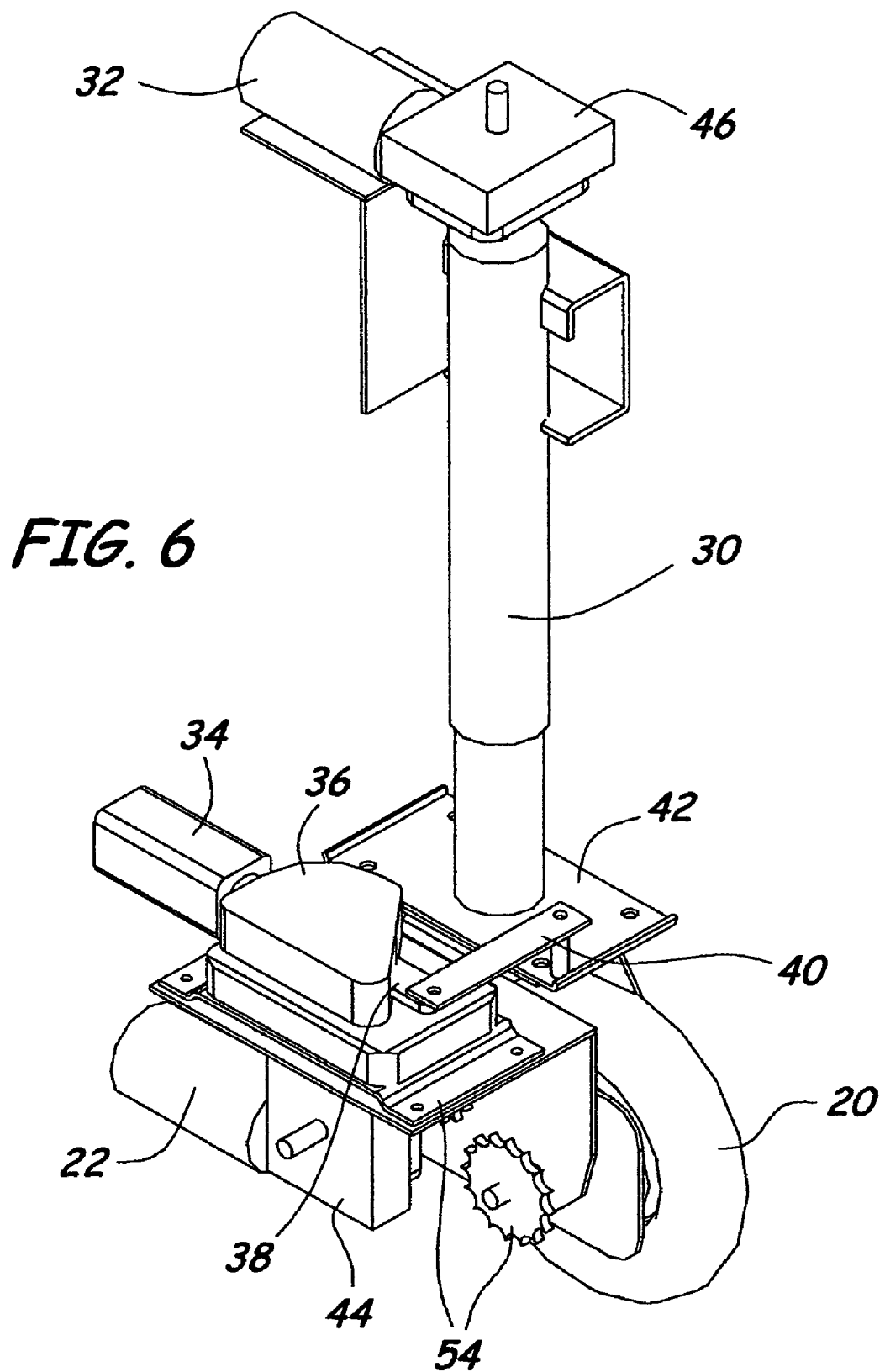
FIG. 6 is a perspective view of the present invention.

Turning to FIG. 6, therein is shown the present invention steering drive motor 22, wheel 20, arm 30, upper lift motor 32 and steering motor 34. It can be seen that steering motor 34 is connected to a gear means 36 having an arm 38 connected to a second arm 40 which is connected to a platform 42 to which wheel 20 is connected. The motor 34 rotates in a direction selected to operate the gear mechanism 36 and move arm 40 in the appropriate direction to turn platform 42 and wheel 20 connected thereto so that the wheel can be turned to the left or the right. Drive motor 22 turns wheel 20 through another gear mechanism 44 in a direction to move the trailer either forward or to the rear. Motor 32 connects through a third gear mechanism 46 so as to move arm 30 up and down in order to raise and lower the wheel. Also shown are a pair of chain drive sprockets 54 which provide a drive means for gear means 44 so that drive motor 22 turns wheel 20. The gear sprocket shown here could likewise be replaced by a belt and pulley drive or a direct gear drive mechanism as would be done in the standard manner by one skilled in the arts.

Figure 7:
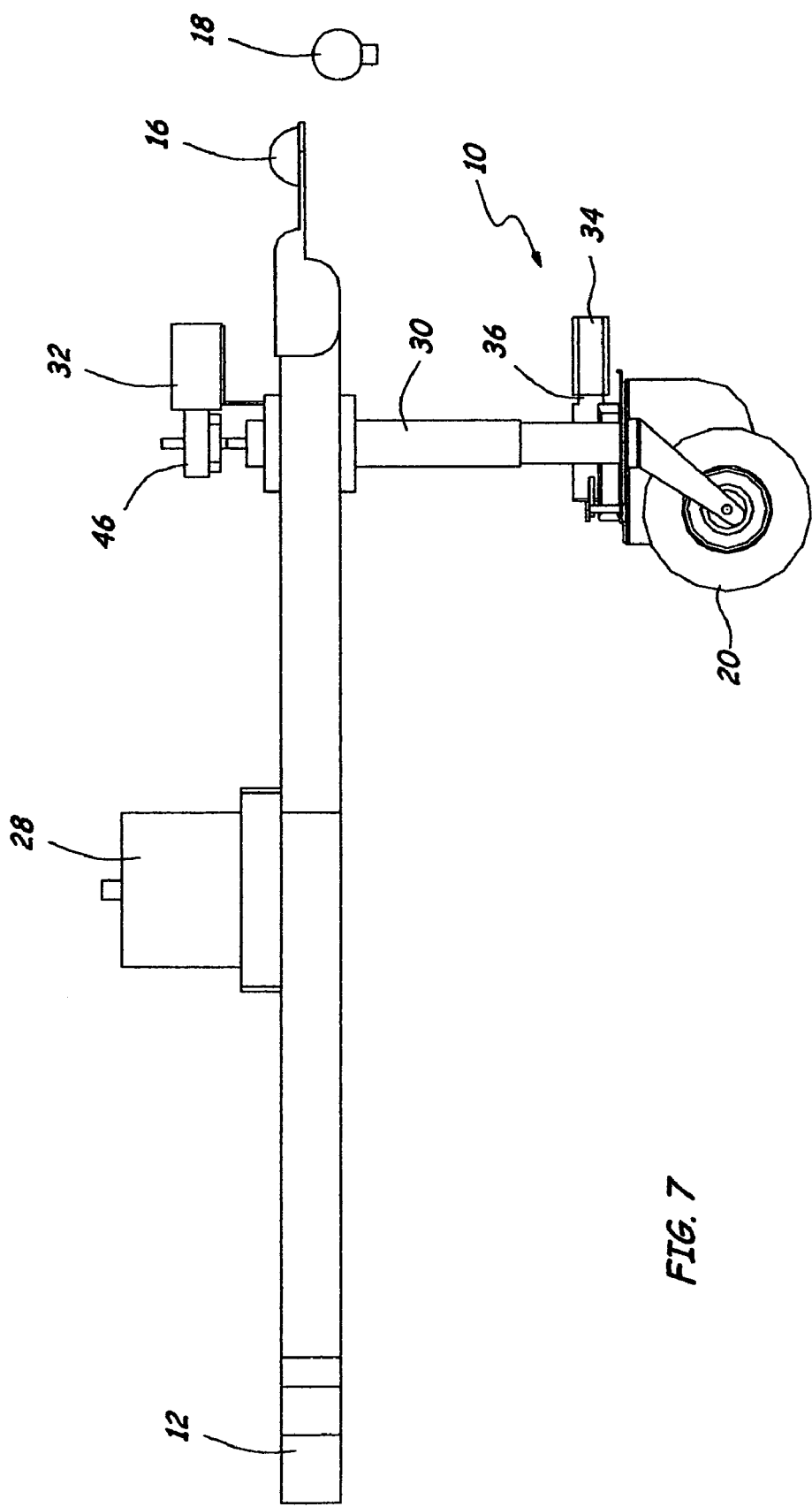
FIG. 7 is an side elevation view of the present invention.

Turning to FIG. 7, therein is shown the present invention 10 along with trailer 12, tongue 14, hitch 16, ball 18, and battery 28. Shown are the steering motor 34 along with the lifting motor 32 and wheel 20. Steering motor 34 is shown connected to its gear mechanism 36 and lift motor 32 is shown connecting to its gear mechanism 46. Telescoping arm 30 is also shown.

Figure 8:
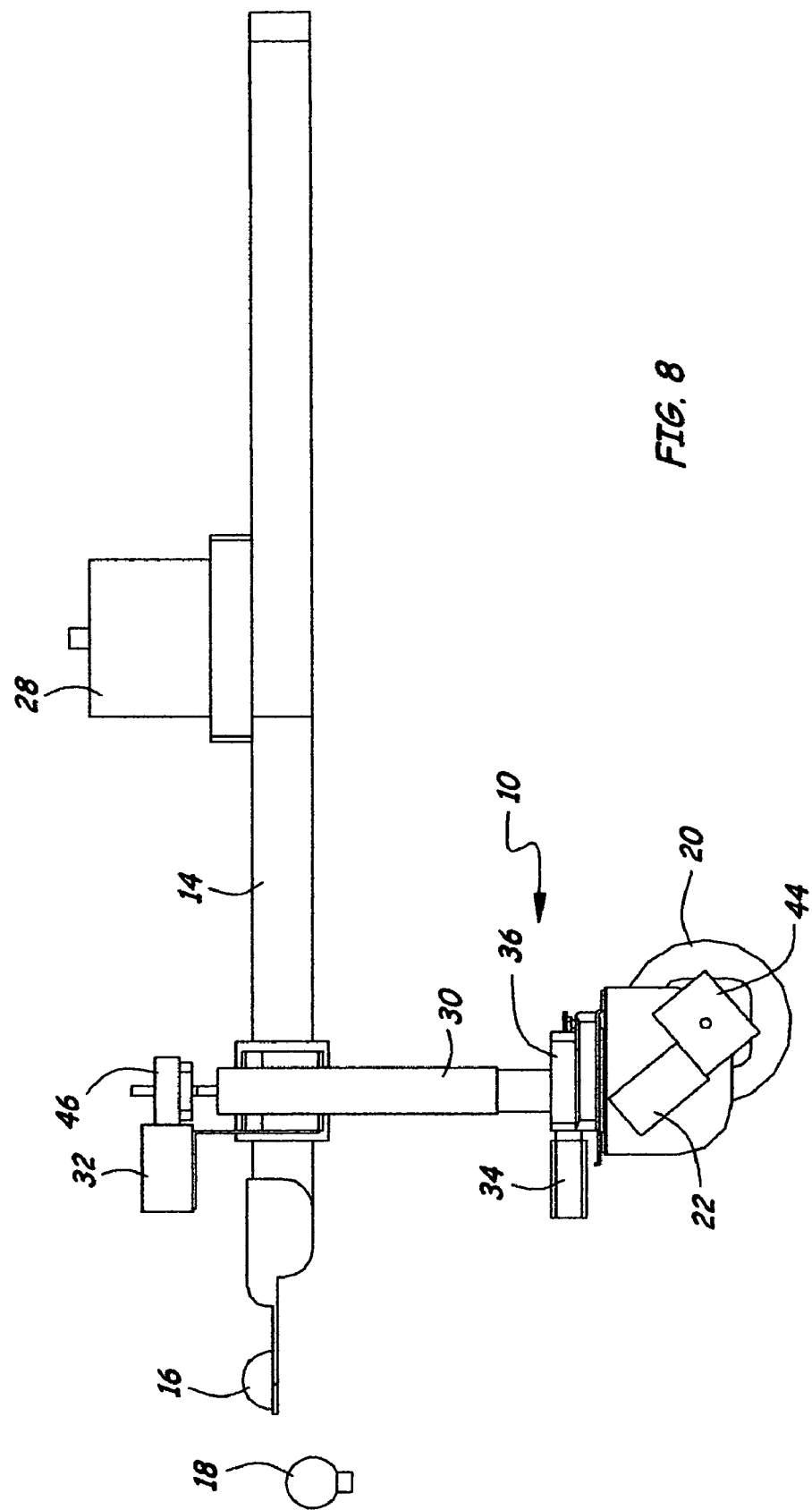
FIG. 8 is a side elevation view of the present invention.

Turning to FIG. 8, therein is shown the present invention 10 along with trailer 12, tongue 14, hitch 16, ball 18, and battery 28. Shown are the steering motor 34 along with the lifting motor 32 and wheel 20. Steering motor 34 is shown connected to its gear mechanism 36 and lift motor 32 is shown connecting to its gear mechanism 46. Shown are wheel drive motor 22 along with its gear mechanism 44. Telescoping arm 30 is also shown.

Figure 9:
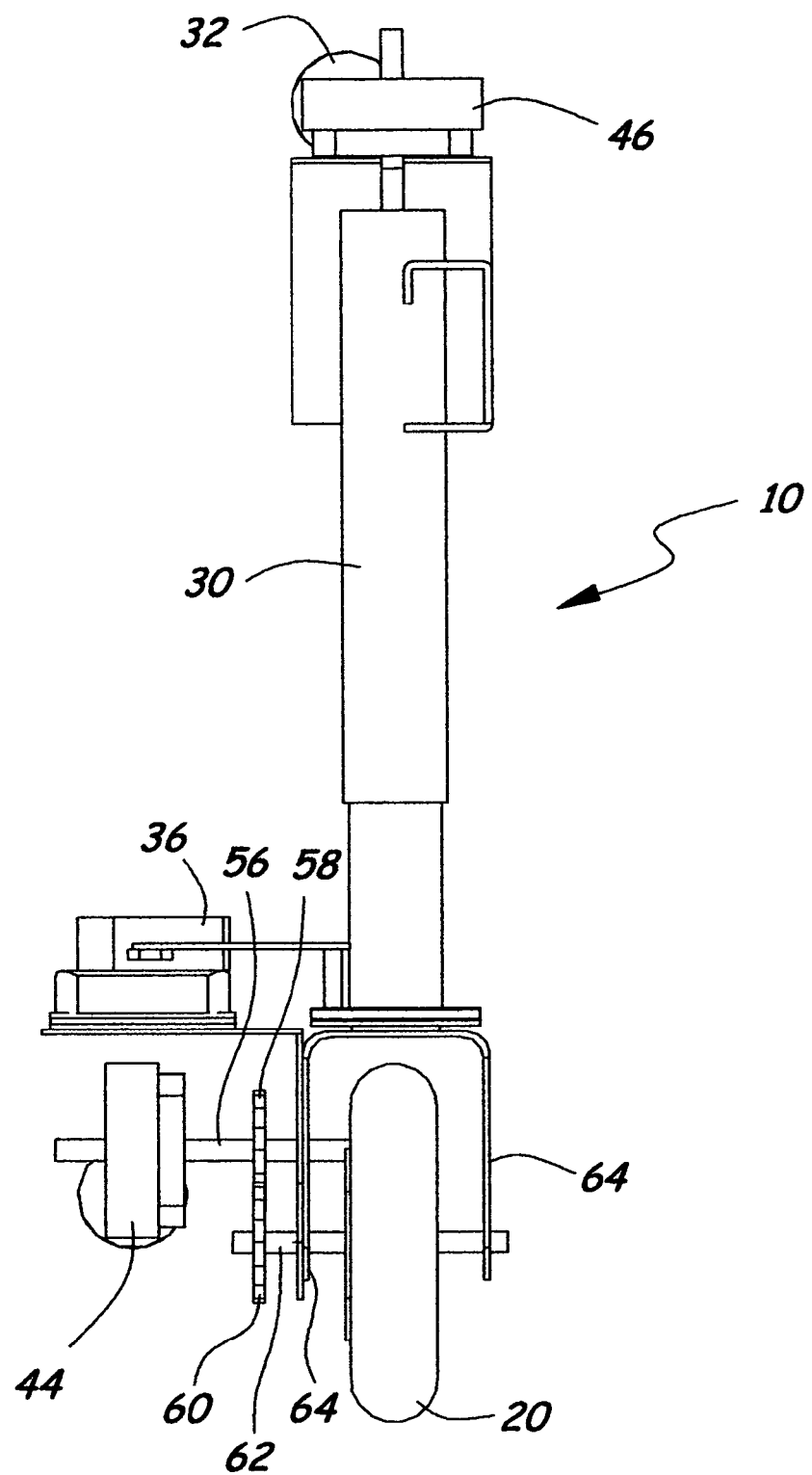
FIG. 9 is a front elevation view of the present invention.

Turing to FIG. 9, therein is shown the present invention 10, the lifting motor 32 and wheel 20. The gear mechanism 36 and lift motor 32 is shown connecting to its gear mechanism 46. Shown are wheel drive motor 22 along with its gear mechanism 44. Telescoping arm 30 is also shown. It can be seen that the drive motor 22 operates through a gear mechanism 44 which changes the drive angle to rotate axle 56 which turns a first gear 58 mounted thereon which gear 58 turns gear 60 fixed to axle 62 which then turns wheel 20. Axle 62 is mounted into a bearing race 64 in the standard manner as would be done by one skilled in the art.

Figure 10:
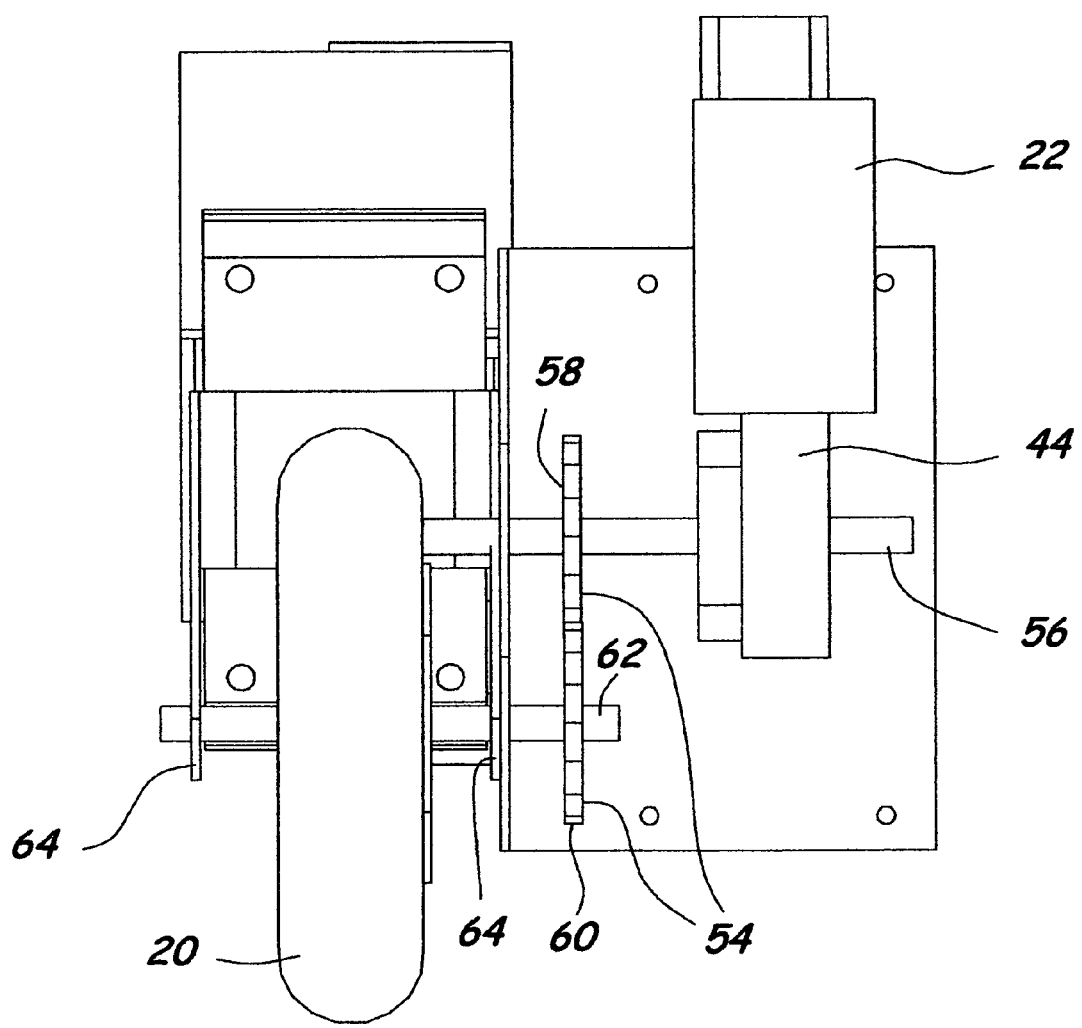
FIG. 10 is a rear elevation view of the present invention.

Turning to FIG. 10, therein is shown the wheel drive motor 22 of the present invention along with its gear mechanism 44 and sprocket drive means 54 and wheel 20. It can be seen that the drive motor 22 operates through a gear mechanism 44 which changes the drive angle to rotate axle 56 which turns a first gear 58 mounted thereon which gear 58 turns gear 60 fixed to axle 62 which then turns wheel 20. Axle 62 is mounted into a bearing race 64 in the standard manner as would be done by one skilled in the art.

Figure 11:
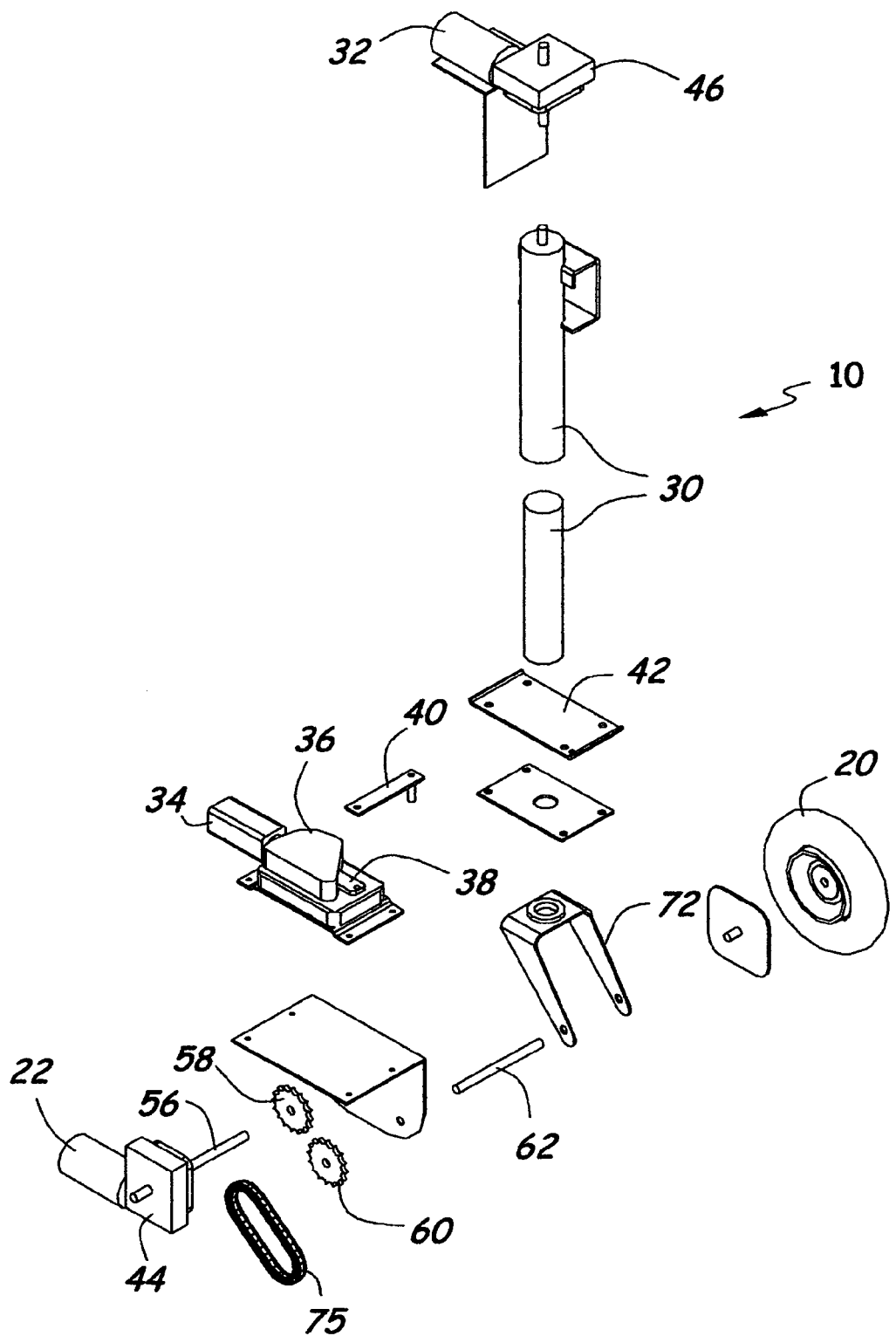
FIG. 11 is an exploded view of the present invention

Turning to FIG. 11, therein is shown the present invention 10 with drive motor 22, wheel 20, battery 28, arm 30, upper lift motor 32 and steering motor 34. It can be seen that steering motor 34 is connected to a gear means 36 having an arm 38 connected to a second arm 40 which is connected to a platform 42 to which wheel 20 is connected through fork 72. The motor 34 rotates in a direction selected to operate the gear mechanism 36 and move arm 40 in the appropriate direction to turn platform 42 and wheel 20 connected thereto so that the wheel can be turned to the left or the right. Drive motor 22 turns wheel 20 through another gear mechanism 44 and chain 75 and sprockets 58, 60 in a direction to move the trailer either forward or to the rear. Motor 32 connects through a third gear mechanism 46 so as to move arm 30 up and down in order to raise and lower the wheel. Thus it can be seen that the three motors 22, 32 and 34 are each connected through gear mechanisms 44, 46 and 36 so as to provide certain functions to the present invention in order to operate the present invention in the desired manner. Other previously disclosed elements are also shown.

Figure 12:
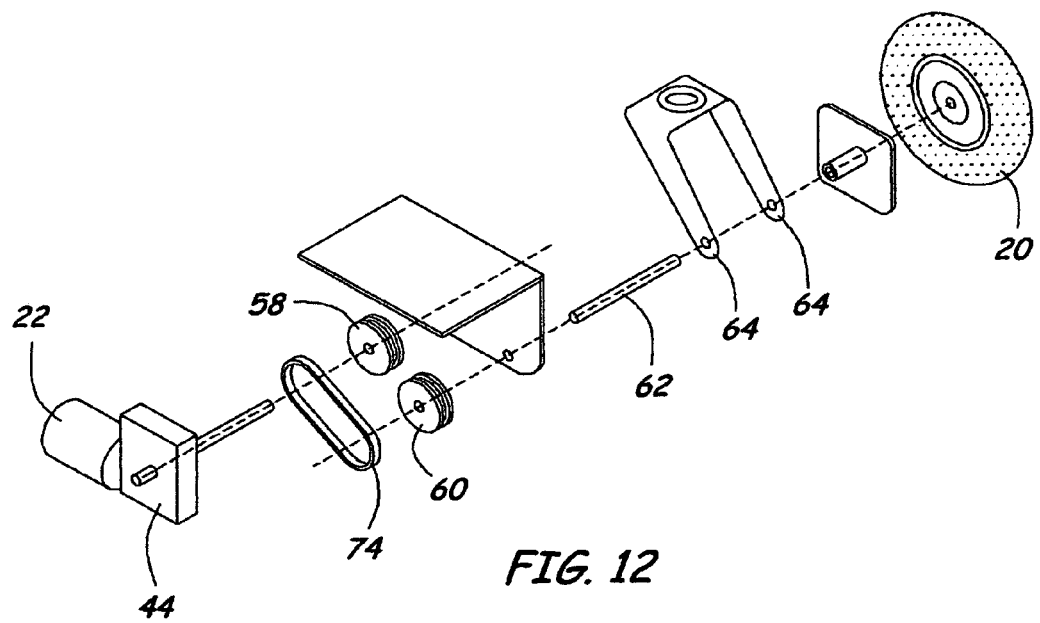
FIG. 12 is an exploded view of the present invention.

Tuning to FIG. 12, shown therein is the wheel drive motor 22 of the present invention along with its gear mechanism 44 and belt 74 and pulley drive means 58, 60 and wheel 20. It can be seen that the drive motor 22 operates through a gear mechanism 44 which changes the drive angle to rotate axle 56 which turns a first pulley 58 mounted thereon which pulley 58 turns pulley 60 fixed to axle 62 which then turns wheel 20. Axle 22 is mounted into a bearing race 64 in the standard manner as would be done by one skilled in the art.

Figure 13:
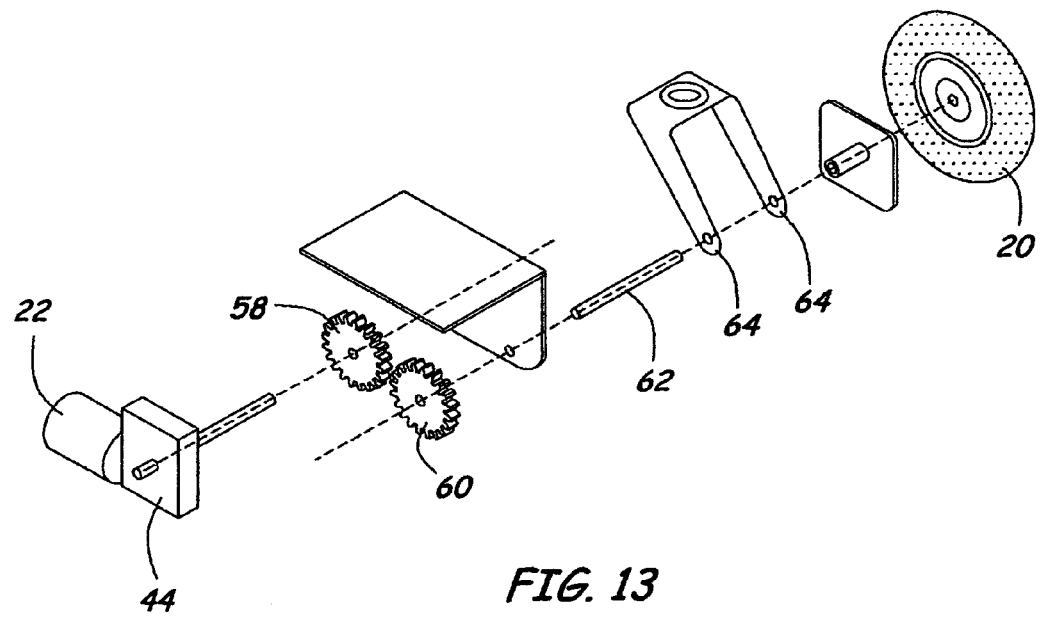
FIG. 13 is an exploded view of the present invention.

Turning to FIG. 13, shown therein is the wheel drive motor 22 of the present invention along with its gear mechanism 44 and gear drive means 58, 60 and wheel 20. It can be seen that the drive motor 22 operates through a gear mechanism 44 which changes the drive angle to rotate axle 56 which turns a first gear 58 mounted thereon which gear 58 turns gear 60 fixed to axle 62 which then turns wheel 20. Axle 22 is mounted into a bearing race 64 in the standard manner as would be done by one skilled in the art.

Figure 14:
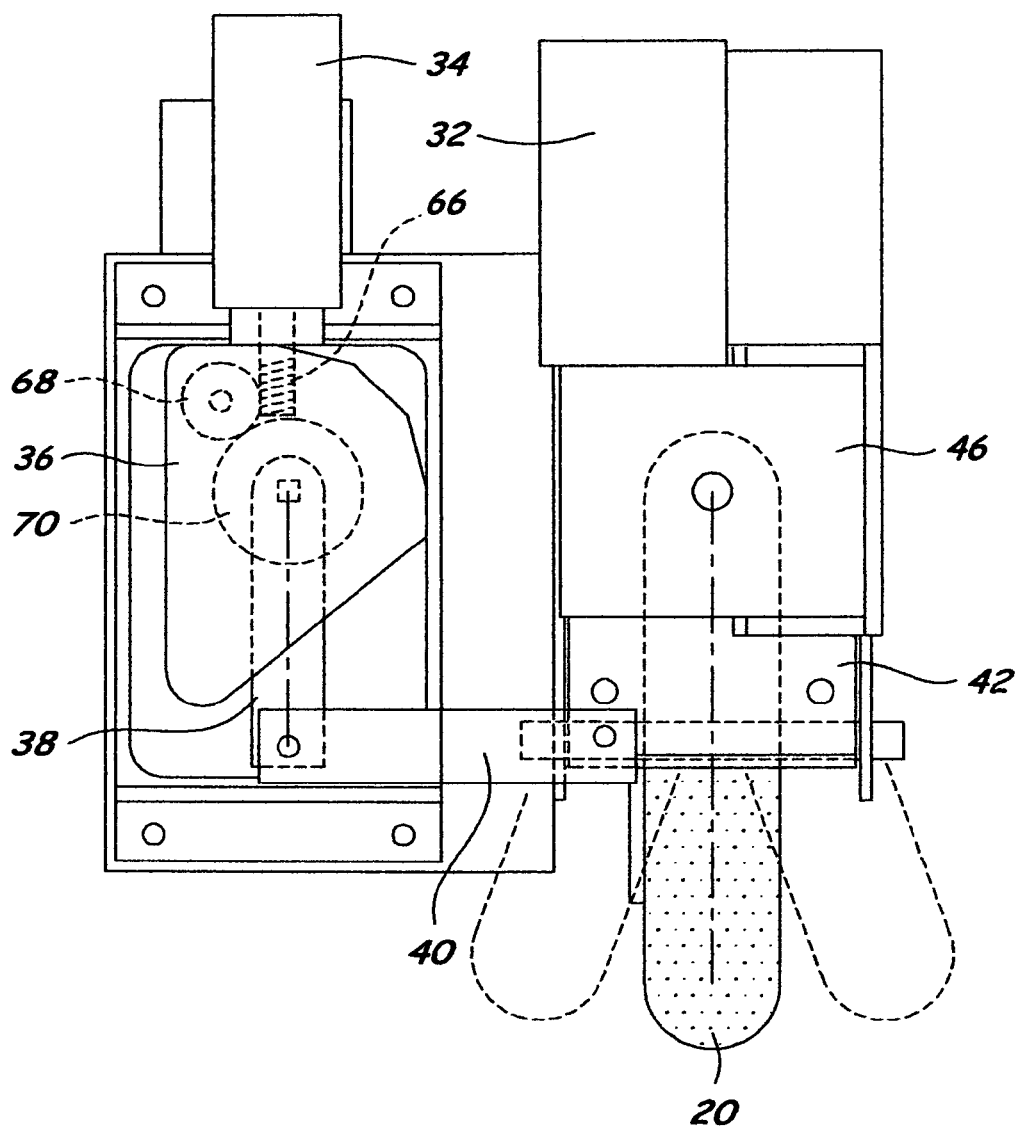
FIG. 14 is a cutaway view of parts of the present invention.

Turning to FIG. 14, shown therein is a top view showing the internal parts of the steering motor 34, drive mechanism 36, wherein a threaded shaft or pinion 66 extends from motor 34 and contacts a first gear 68 which drives a second gear 70 which then moves arm 38 and aim 40 so that the platform 42 to which arm 40 is connected moves in a horizontal plane in the right-left direction which then moves tire 20 from the right to the left. Also shown is lift motor 32 and the gear mechanism 46.

In operation, the trailer 12 is capable of being steered left and right and of being lifted up and down along with being driven forward and reversed. When the trailer is being pulled by the towing vehicle, the drive wheel would be raised and placed in a stowed position so as to be out of the way.

Figure 15:
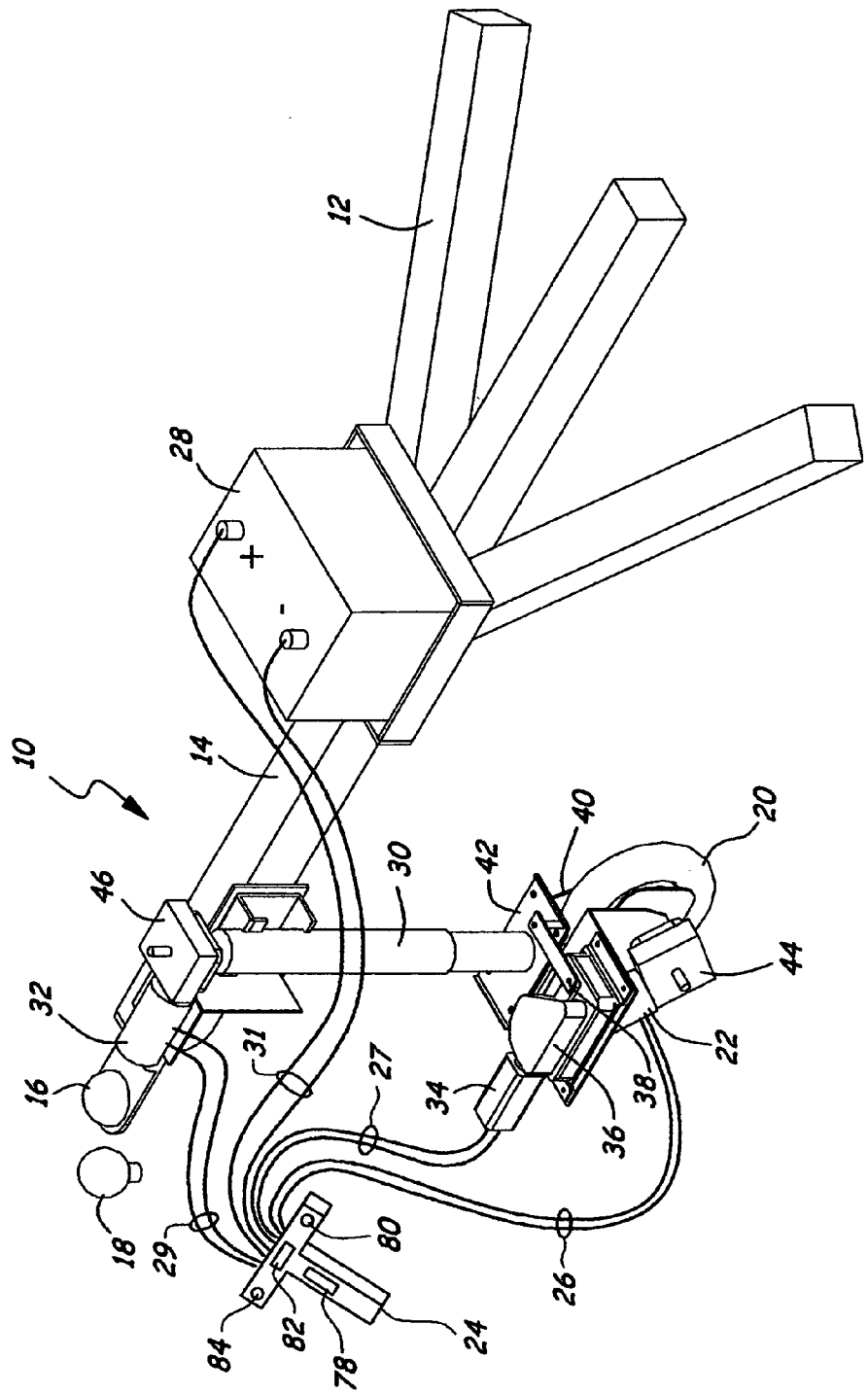
FIG. 15 is a perspective view of the present invention.

Turning to FIG. 15, shown therein are motors 22, 32, 34 connected to an exemplary hand-held controller 24 by means of electrical connections 26, 27 and 29. The controller 24 is expected to have controls for moving the present invention up and down at 78, forward and backward at 80, on/off at 82 and steering to the left and right at 84. The motors are expected to be electrically connected to battery 28 at 31 and powered electrically by the 12-volt batter system 28 used in the vehicle and/or trailer 12. Other previously disclosed elements are also shown

What is claimed is:

1. A drive mechanism for mounting to the tongue of a boat trailer, comprising:
    a) a jack having a first end adapted for attachment to the tongue of a trailer and a second end adapted for having a wheel attached thereto, said wheel for making contact with the ground, said wheel being mounted on a wheel fork being disposed on said second end of said jack, said wheel fork having a first end adapted for rotatable attachment to said second end of said jack and a second end having said wheel disposed thereon, said wheel fork being rotatable in the horizontal plane so that said wheel can turn in the left and the right direction;
    b) a first electrical motor having an output shaft thereon, said shaft being adapted to drive said wheel through a gear drive mechanism, said gear drive mechanism having a first gear with teeth thereon adapted for attachment to said motor and a second gear with teeth thereon adapted for attachment to said wheel to permit the wheel to turn in a direction to move the trailer forward and backward, wherein the teeth of said first gear contacts the teeth of said second gear and thereby turns said second gear which thereby turns said wheel;
    c) a telescoping shaft disposed on said jack, said telescoping shaft having a first section and a second section wherein each of said first and second sections each have an end corresponding to said first and second ends of said jack, a second electrical motor having an output shaft thereon, said shaft being adapted to move said telescoping shaft up and down through at least one gear mechanism;
    d) a third electrical motor having an output shaft thereon, said shaft being adapted to turn said wheel to the left and right through at least one gear mechanism, wherein said wheel rotates to the left and to the right on said second end of said wheel fork which is rotatably disposed on said second end of said jack, wherein said jack is stationary as said wheel fork rotates to the left and to the right;
    e) wherein said telescoping shaft is adapted to be rotated ninety degrees to a position parallel with the tongue of the trailer so that said wheel is adjacent the tongue of the trailer to permit the trailer to be towed; and,
    f) means for controlling the drive mechanism whereby the drive mechanism can be turned on and off, the trailer can be moved forward and backward, the wheel is moved up and down, and the wheel can be turned to the left and to the right.

2. The drive mechanism of claim 1, wherein the drive mechanism is electrically powered, further comprising means for receiving and applying a potential to the drive mechanism whereby the drive mechanism can be powered.

3. The drive mechanism of claim 2, wherein said output shaft of said first electrical motor is adapted to drive said wheel through a chain and sprocket drive mechanism having a first sprocket adapted for attachment to said first electrical motor and a second sprocket adapted for attachment to said wheel to permit the wheel to turn in a direction to move the trailer forward and backward.

4. The drive mechanism of claim 2, wherein said output shaft of said first electrical motor is adapted to drive said wheel through a belt and pulley drive mechanism having a first pulley adapted for attachment to said first electrical motor and a second pulley adapted for attachment to said wheel to permit the wheel to turn in a direction to move the trailer forward and backward.

* * * * *